June 25, 1935.  C. BEST  2,006,255
DAMPENER FOR WEIGHING APPARATUS
Filed Jan. 12, 1935　　2 Sheets-Sheet 2
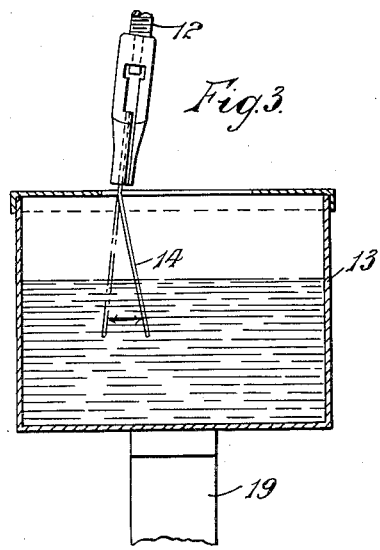
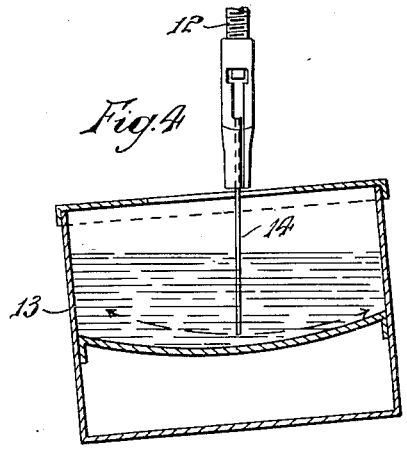
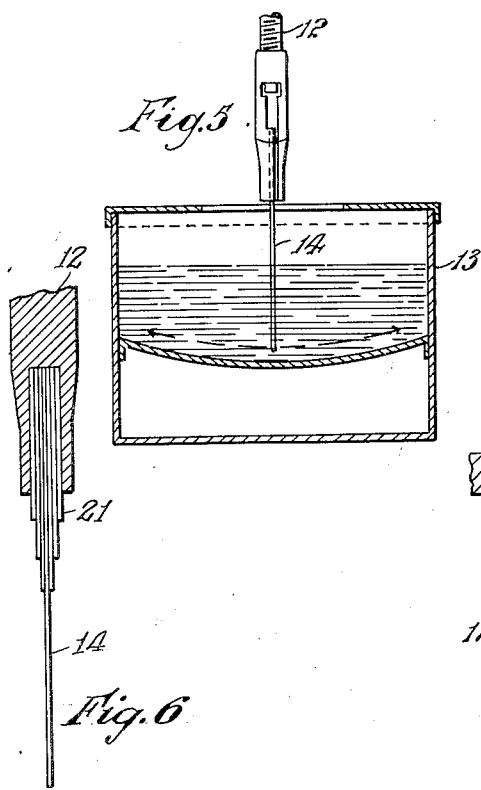
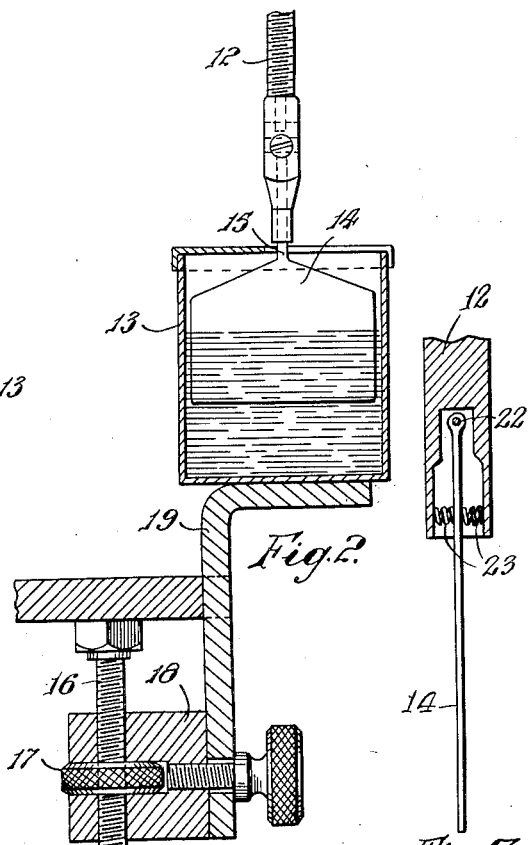
INVENTOR
Cyril Best,
By Watson, Coit, Moore & Grindle
ATTYS.

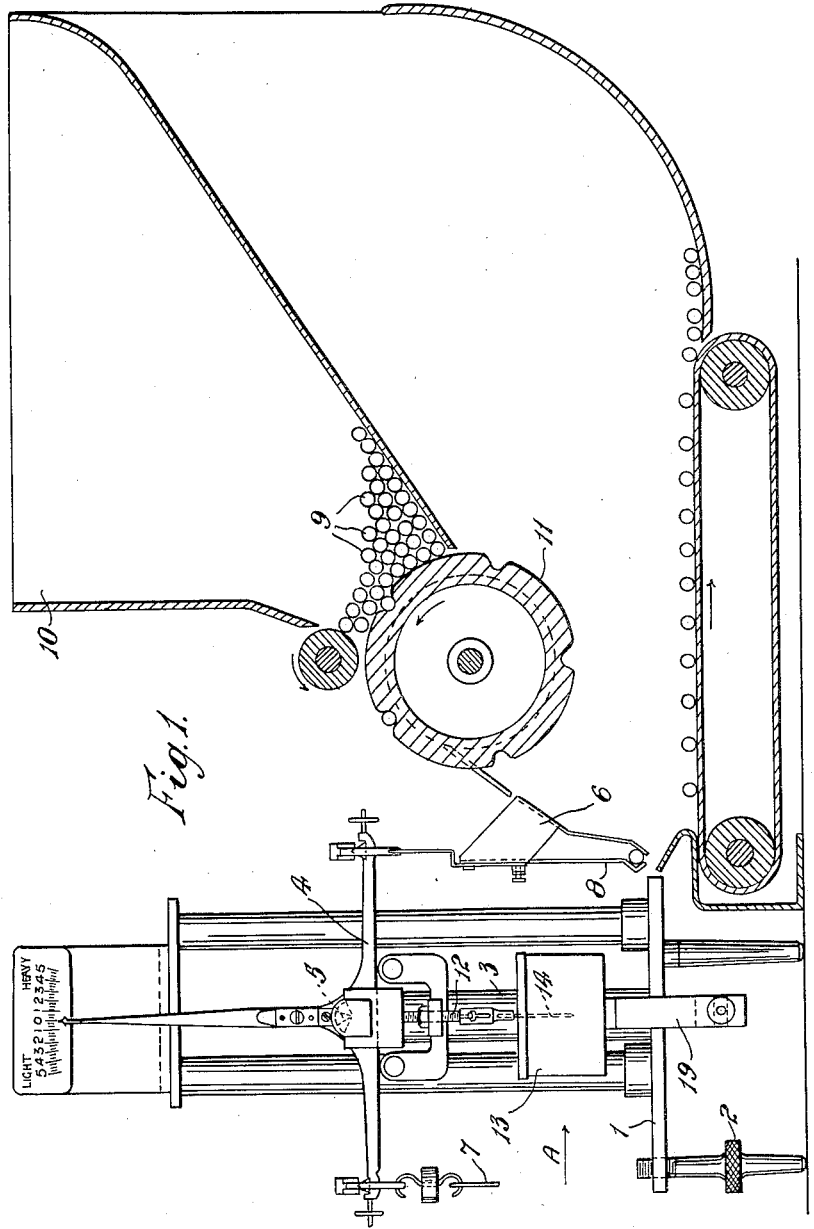

Patented June 25, 1935

2,006,255

UNITED STATES PATENT OFFICE 2,006,255

DAMPENER FOR WEIGHING APPARATUS

Cyril Best, Deptford, London, England

Application January 12, 1935, Serial No. 1,562
In Great Britain January 9, 1934

6 Claims. (Cl. 188—93)

This invention is for improvements in or relating to weighing apparatuses, and refers more particularly to a damping apparatus for damping the swing of the weigh-beam and pointer during a weighing operation.

It has been proposed in weighing apparatuses to damp the swing by employing a vane, operatively connected to the weigh-beam, such vane being arranged inside a container filled with oil to offer a resistance to the swinging movement.

Such arrangements reduce the time taken for the weigh-beam to come to rest, and it is an object of the present invention to reduce still further the time taken in bringing the weigh-beam to rest during or after a weighing operation.

According to the present invention, there is provided weighing apparatus in which the weigh-beam is brought to rest by a vane moving in a fluid (e. g., in a liquid or in a gaseous medium), and mounted on a swinging arm operatively connected to, or integral with, the weigh beam, characterized in that the vane is resilient or is resiliently mounted on the swinging arm, or is both resilient and resiliently mounted on the swinging arm.

The vane may comprise a thin resilient member of relatively large area with a narrow extension which is formed integral therewith, and which is secured to the swinging arm, and the time interval for bringing the weigh beam to rest may be regulated by relative adjustment between the vane and the fluid.

The invention will be more particularly described with reference to the accompanying drawings, in which:—

Figure 1 is a side elevation of a weighing apparatus in which there is a damping vane constructed in accordance with the invention.

Figure 2 is a view taken in the direction of arrow A, Figure 1 and illustrates to an enlarged scale a damping vane constructed in accordance with the invention.

Figure 3 is a view to an enlarged scale of a portion of Figure 1 and illustrates the operation of the damping vane.

Figures 4 and 5 are enlarged views of a modified form of container for the vane.

Figures 6 and 7 are fragmentary sectional views illustrating modified forms of support for a rigid damping vane.

Referring to the drawings, the weighing apparatus comprises a base plate 1 adjustable for level by means of screws 2 and having an upstanding support 3 on which a beam 4 is balanced by knife edges 5 in the well known manner. As is usual, one side of the beam 4 carries a scale pan 6 for the articles to be weighed, and weights 7 are provided on the other side of the arm.

When the scale is used for weighing cigarettes, the scale pan 6 is preferably of substantially wedge shape. The scale pan is pivotally mounted to hang from the thick end of the wedge so that the thin edge points downwardly. One of the converging walls of the scale pan consists of a weak spring element 8 which is just strong enough to grip one cigarette in the pan.

If desired, the cigarettes may be automatically supplied in succession to the scale pan. The cigarettes 9 may be placed in a hopper 10 from which they are removed by a conveyor such as a fluted drum 11, and delivered to the scale pan. The delivery of the cigarettes to the scale pan is preferably timed so that sufficient time elapses between the delivery of each successive cigarette for weighing and the action of the succeeding cigarette in entering the scale pan knocks out the previous cigarette on to a travelling band or into a suitable receptacle, and the spring then grips the newly arrived cigarette.

In order to enable full advantage to be taken of the above quick method of loading the scale pan, it is necessary to arrange that the weigh-beam will be brought to rest as soon as possible after a new article to be weighed, such as a cigarette, is inserted in the scale pan. For this purpose, a swinging arm 12 is formed integrally with the weigh-beam 4, and extends downwardly through the top of a container 13 containing oil, or other suitable fluid such as spirit, or water. On the lower end of this swinging arm there is mounted a vane 14 consisting of a thin piece of spring steel having a portion of relatively large area, which is arranged transversely to the direction of swing of the swinging arm, as shown in Figures 1 and 3, and extending from this large portion there is a narrow portion 15 which is secured to the swinging arm.

If the vane is made sufficiently delicate and of sufficiently large area, the container of liquid could be dispensed with, and the vane arranged to move through air or other gaseous medium.

Many alternative methods may be used for securing the vane to the arm, but a convenient way of doing so is to provide in the arm 12 a longitudinal slot in which the narrow extension 15 on the vane 14 is held with the plane of the vane lying transversely to the direction of movement of the swinging arm 12.

It is found that this arrangement considerably reduces the time taken for bringing the weigh-beam to rest, as against the time taken to bring the beam to rest by a rigid vane rigidly secured to the swinging arm attached to the weigh-beam.

Instead of forming the vane of resilient material, the vane could be made of relatively rigid material and secured to the swinging arm resiliently, such as by a helical or leaf spring. Thus in Figure 6 a rigid vane 14 is secured by means of a leaf spring 21 to the swinging arm 12, whereas in Figure 7 the vane is pivoted to the arm 12 as indicated at 22, coil springs 23 being interposed between the vane and the arm 12 to permit lateral flexing of the vane as a whole.

It will be observed that in the first of the constructions just described, owing to the fact that the swinging arm 12 is connected to the narrow extension 15 of the vane 14, this narrow extension constitutes a resilient connection between the vane and the swinging arm, and owing to the relative weakness of this narrow spring portion in comparison with the rest of the vane, the vane will bend at the narrow portion, whilst the main portion of the vane will remain relatively rigid in operation, although the vane itself is flexible.

The action of the vane is as follows:—

As the weigh-beam 4 swings from one position to another, endeavouring to reach a point of equilibrium, the vane 14, is, during the first portion of the swing before the position of equilibrium is reached, bent back through the movement of the beam forcing it against the resistance of the oil in the container 13. Owing to this bending or flexing at this time the vane offers little resistance to the movement so that the weigh-beam is permitted to move relatively rapidly, but as the unequal forces acting on the weigh-beam bring the latter towards the position of equilibrium the pressure exerted on the vane is decreased so that the latter is then able to straighten or restore itself to its normal position. This straightening out or restoring of the vane not only tends to offer an increased resistance to any continued movement of the weigh-beam in the initial direction of swing by reason of the increased surface it offers in the direction of movement, but also by reason of its relatively fast movement in the direction shown in Figure 3 through the oil in the same direction that the arm is swinging, impart to the weigh beam a kick in the opposite direction, thereby bringing the weigh-beam rapidly to rest.

The apparatus may be adjusted in order to regulate the time for bringing the weigh-beam to rest by raising or lowering the oil container by means of the adjusting screw 16 and nut 17 which operates in the block 18 to which the container support 19 is secured, thus altering the area of the vane that is in contact with the oil. Alternatively, or in addition to the foregoing adjustments, the vane 14 may be adjustably mounted on the arm 12 so that it is movable towards and away from the fluid.

In Figure 5 the container is shown with a rounded bottom in order to keep the adjusting of the bottom of the vane as nearly constant as possible throughout its movement. Any suitable shape may be provided for the bottom of the container.

It is frequently found that the spring steel from which the vanes are made has a stronger restoring force to return it to its initial shape when it is flexed one way than it is when it is flexed the opposite way. For this purpose the container 13 may be tilted sideways such as shown in Figure 4. By so tilting the container it is found that the vane is subjected to a greater resistance in the container 13 when it is trying to restore itself to its normal shape from one side than it has from the other. In this way the time taken for bringing the beam to rest can be made equal for whichever way the beam swings.

If desired, the container shown in Figure 3 may be likewise tilted. The shape of the bottom of the container 3 may be made to any desired shape to ensure that the weigh-beam will be brought to rest equally whichever side it may have swung during a weighing operation.

What I claim as my invention and desire to secure by Letters Patent is:—

1. In apparatus for performing delicate weighing operations of the type provided with a weigh-beam, means associated with said weigh-beam for damping oscillations induced therein, said means comprising a vane moving in a fluid and having at least a portion thereof flexibly connected with said weigh-beam, whereby the said flexibly connected portion of the vane may lag behind the weigh-beam in reaching a state of equilibrium during a weighing operation.

2. In apparatus for performing delicate weighing operations of the type provided with a weigh-beam, means associated with said weigh-beam for damping oscillations induced therein, said means comprising a vane moving in a fluid and flexible in the direction of movement operatively connected with said weigh-beam, whereby said vane may lag behind the weigh-beam in reaching a state of equilibrium during a weighing operation.

3. In apparatus for performing delicate weighing operations of the type provided with a weigh-beam, means associated with said weigh-beam for damping oscillations induced therein, said means comprising a vane moving in a fluid, and a resilient operative connection between said vane and said weigh-beam, whereby said vane may lag behind said weigh-beam in reaching a state of equilibrium during a weighing operation.

4. In apparatus for performing delicate weighing operations of the type provided with a weigh-beam, means associated with said weigh-beam for damping oscillations induced therein, said means comprising a vane moving in a fluid, and a resilient operative connection between said vane and said weigh-beam, whereby said vane may lag behind said weigh-beam in reaching a state of equilibrium during a weighing operation, said resilient connection including a narrowed and integral portion of said vane.

5. In apparatus for performing delicate weighing operations of the type provided with a weigh-beam, means associated with said weigh-beam for damping oscillations induced therein, said means comprising a vane operatively connected with said weigh-beam, a container adapted to be partially filled with liquid in which said vane extends, and means for canting the container to alter to different extents the immersion of the vane in the liquid at different points in the path of movement of the vane, whereby the degree of resistance to movement of the weigh-beam offered by the vane may be increased for certain weights only.

6. In apparatus for performing delicate weighing operations of the type provided with a weigh-beam, means associated with said weigh-beam for damping oscillations induced therein, said means comprising a rigid vane moving in a fluid, and an operative connection including a spring device interposed between said vane and said weigh-beam, whereby said vane may lag behind said weigh-beam in reaching a state of equilibrium during a weighing operation.

CYRIL BEST.